United States Patent [19]

Berscheid et al.

[11] Patent Number: 4,687,530
[45] Date of Patent: Aug. 18, 1987

[54] METHOD OF AND APPARATUS FOR LINING A PIPE INSULATING SHELL CONSISTING OF MINERAL FIBERS WITH A FOIL

[75] Inventors: Peter Berscheid, Kurten-Spitze; Jakob Friesdorf, Bergisch Gladbach, both of Fed. Rep. of Germany

[73] Assignee: Isover Saint-Gobain "Les Miroirs", Courbevoie, France

[21] Appl. No.: 917,541

[22] Filed: Oct. 10, 1986

[30] Foreign Application Priority Data

Oct. 10, 1985 [DE] Fed. Rep. of Germany ....... 3536174

[51] Int. Cl.⁴ ............................................. B32B 31/00
[52] U.S. Cl. .................................... 156/215; 156/259; 156/446; 156/447; 156/457; 156/458; 156/510
[58] Field of Search ............... 156/184, 185, 187, 188, 156/443, 446–448, 456–458, 212–215, 217, 218, 191, 192, 259, 271, 193, 510, 250, 257; 83/54

[56] References Cited

U.S. PATENT DOCUMENTS

| | | | |
|---|---|---|---|
| 3,121,253 | 2/1964 | Varrial | 156/450 X |
| 3,658,614 | 4/1972 | Beck | 156/187 |
| 3,839,122 | 10/1974 | Current et al. | 156/446 X |
| 3,891,493 | 6/1975 | Terry | 156/457 X |
| 4,153,498 | 5/1979 | Bichot et al. | 156/446 |
| 4,284,448 | 8/1981 | Popp et al. | 156/215 X |

Primary Examiner—David Simmons
Attorney, Agent, or Firm—Oblon, Fisher, Spivak, McClelland, & Maier

[57] ABSTRACT

For all-over lining of a longitudinally slit pipe insulating shell consisting of mineral fibers, with a foil having a coating of a heat activatable adhesive, a fully automatic process uses the steps of bringing the foil into a preliminary position with its end portion bent over downwardly by means of a rail, subsequently moving the foil into a position of readiness in which its outer edge comes to bear on a vertically adjustable heating roller, so that an initial activation of the adhesive starts to take place, then raising the heating roller to the pipe insulating shell and permitting it to remain in this adhering position for a brief period, and finally carrying out the actual lining operation by rotating both the heating roller and the pipe insulating shell at the same peripheral speed, and in opposite direction by means of a winding mandrel.

12 Claims, 6 Drawing Figures

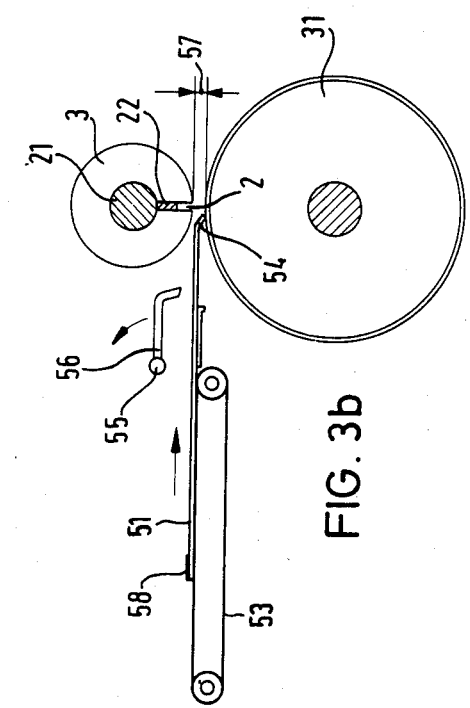
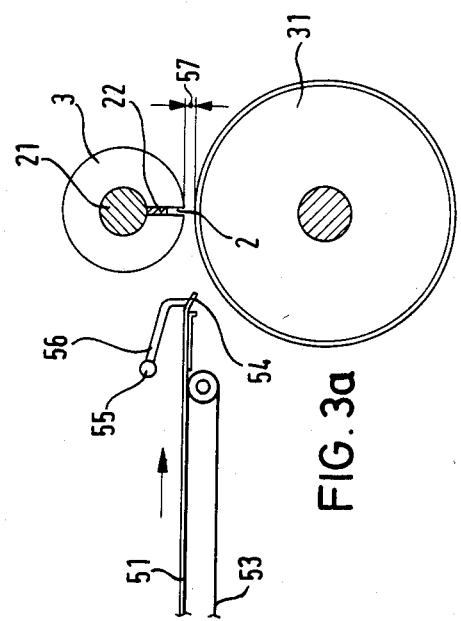
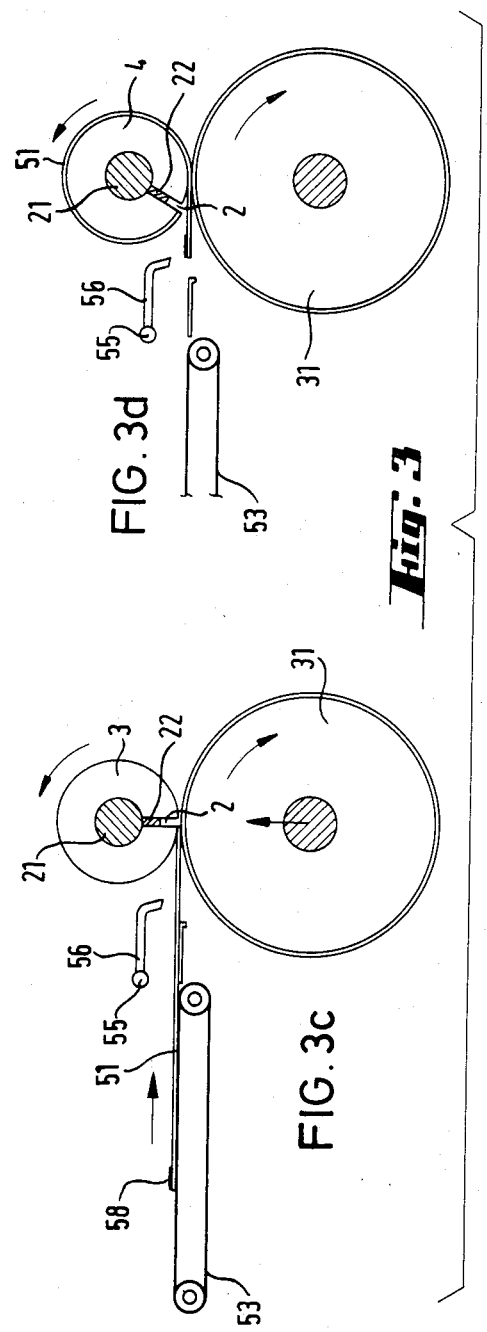

METHOD OF AND APPARATUS FOR LINING A PIPE INSULATING SHELL CONSISTING OF MINERAL FIBERS WITH A FOIL

BACKGROUND OF THE INVENTION

1. Field of the Invention

The invention relates to a method of lining a pipe insulating shell, particularly one consisting of mineral fibres, with a foil comprising a coating of a heat activatable adhesive, and also to an apparatus suitable for carrying out the method.

2. Background of the Related Art

A method is known from DAS No. 24 16 471 in which a pipe insulating shell is lined by means of an apparatus comprising two parallel and adjacently disposed driveable rollers for supporting and rotating the pipe insulating shell. Diametrically opposite these rollers, there is also in this apparatus a pressing means adapted to be driven at the peripheral speed of the rollers and adapted for movement between a working position and a withdrawn loading and ejection position and intended for pressing the pipe insulating shell against the rollers, the foil being fed by feed means orientated transversely of the rollers. To activate the adhesive of the foil, it is furthermore intended that the roller adjacent the foil feed means be constructed as a heating roller.

Where this known apparatus is concerned, in operation a nonslit bare pipe insulating shell is pushed by a chain conveyor axially between the two rollers and the retracted pressing means, after which the pressing means is moved downwardly until it comes to bear against the pipe insulating shell. Afterwards, the pressing means, which is formed of revolving pressing belts, and the two rollers are separately driven so that the floatingly mounted pipe insulating shell is caused to rotate. At the same time, a previously prepared length of foil is introduced transversely and between the heated roller and the pipe insulating shell. As the foil slides over the heating roller, this latter is heated until the adhesive becomes capable of adhesion. At the same time, the foil is pressed by the heating roller against the heat insulating shell and is wound around it until such time as the pipe insulating shell has completed 1¼ revolutions. Lined in this way, once the pressing means has been disengaged again, the pipe insulating shell is then withdrawn axially out of the lining station by the already mentioned chain conveyor.

However, this known lining method is suitable only for nonslit pipe insulating shells, because these latter have a continuous outer surface which only has to be wrapped in the foil. An exact positioning of the pipe insulating shell in order to obtain an exact bearing of the foil against the edge of a longitudinal slit in the shell is not necessary in this case. Even if the foil, while it is being accommodated between the heating roller and the pipe insulating shell, is incorrectly entrained, i.e. does not bear in an exactly parallel position, or if there is a defective initial adhesion, then nevertheless an externally perfect product is obtained since the start of the foil is overlapped at the end by a portion of foil, the length of which corresponds to one quarter of a rotation of the pipe insulating shell. In addition, there is the relatively long stepwise operating time of this apparatus, since a lined shell cannot be removed until an unlined pipe insulating shell can again be pushed onto the rollers to be lined.

SUMMARY OF THE INVENTION

The invention has as its object the improvement of this known method as well as an apparatus suitable for carrying out the method of the invention, in that longitudinally slit pipe insulating shells can be fully automatically, accurately and fully lined with a foil at the highest possible rate, i.e. in cadence with the manufacture of the shells, an exact fixing of the foil on both sides of the longitudinal slit of the pipe insulating shells being simultaneously guaranteed, the longitudinal slit in the pipe insulating shells being preferably produced directly prior to the actual lining process.

According to the invention, a method of lining a pipe insulating shell formed of mineral fibers with a foil having a coating of heat activatable adhesive includes the steps of preliminarily positioning a free end of the foil with a downward angled orientation, resting a leading edge of the free end of the foil on the upper surface of a heating roller positioned below a pipe insulating shell, whereby the adhesive is preliminarily activated at the leading edge, moving the roller toward the shell until the leading edge bears on the shell, maintaining the leading edge pressed against the shell by the roller for a first dwell period, and separately rotatably driving the shell and the roller in opposite directions and with the same peripheral speed to line the foil on the shell.

The invention also includes an apparatus for lining the pipe insulating shell with the foil. The apparatus includes a pipe insulating shell loading station having an elongate receiving mandrel including a central slot, a transport arm for moving a shell in the longitudinal direction of the receiving mandrel and onto the receiving mandrel, and cutting means in the central slot for forming a continuous longitudinal slit in the shell being mounted onto the receiving mandrel. The apparatus also includes a shell winding device comprising an elongate winding mandrel coaxial with the receiving mandrel and including means for connecting to an end of the receiving mandrel, the winding mandrel further including a radially projecting guide strip. The shell winding device further includes means for rotating the winding mandrel and means for moving the winding mandrel into abutment with the receiving mandrel such that the connecting means can connect the receiving and winding mandrels, wherein the transport arm includes means for moving a slitted shell onto the winding mandrel so that the guide strip fits into the slit. The apparatus also includes a lining station comprising a heating roller extending below and parallel to the winding mandrel, means for vertically moving the heating roller and means for rotating the heating roller. Finally, the apparatus includes means for feeding a foil to the lining station, the feeding means including a bar positioned laterally of the lining station and pivotally mounted on an axis parallel with the heating roller.

The advantages attainable by the invention reside particularly in that by virtue of the onset of activation of the adhesive of the foil and the resultant adhesion phase, an exact entrainment of the commencement of the foil by the rotating pipe insulating shell is guaranteed so that a relatively high lining speed is possible and thus a short operation time of, for example, 7 seconds, and the foil adheres rigidly in the region of the edge of the longitudinal slit and cannot become detached when the pipe insulating shell is fitted.

If it is intended to line an already slit pipe insulating shell, it is advantageous for this to be pushed onto a winding mandrel axially parallel with the heating roller and having a vertically downwardly radially projecting guide and drive strip which engages the longitudinal slit in the pipe insulating shell, while at the same time the angled-over end portion of the foil is so positioned that its outer edge is adjacent an imaginary plane which extends in an extension of the longitudinal slit in the pipe insulating shell. By such a readiness position for the foil, it is assured that shortly before commencement of the actual lining process, the foil is applied exactly against the edge of the longitudinal slit.

If the lining of a pipe insulating shell can occur in cadence with its manufacturing process in order to arrive at a fully continuous operation, then a method is used in which, in order to make ready a slit pipe insulating shell, a non-slit pipe insulating shell from a so-called shell producing machine is pushed by a transport arm, in a single continous and progressive motion, onto a receiving mandrel disposed coaxially of the winding mandrel, the longitudinal slit being thereby formed in the pipe insulating shell by a cutting means, and then fully onto the winding mandrel which is located coaxially of the receiving mandrel.

If an overhanging so-called closure sealing tab is used, with a self-ahesive strip, it is expedient if, during the actual lining process, the heating roller and the winding mandrel are driven until such time as the lined pipe insulating shell has been rotated through about 340° to 350°, after which the heating roller remains briefly in this position for adhesion of the closure and then lowered into its starting position. This interruption in the lining process guarantees that the overhanging sealing tab does not become stuck to the foil which has already been applied to the shell.

The apparatus provided for carrying out the method of the invention resolves the problem posed and also makes it possible to operate a fully continuous production line with which it is furthermore possible to line random batches of pipe insulating shells of different cross-sectional dimensions. This latter is easily possible in that for different ranges of inside diameters of pipe insulating shells, various receiving mandrels and winding mandrels corresponding to the relevant dimensions are kept in stock, different outside diameters of pipe insulating shells being compensated for by the fact that the height of the heating roller is adjustable.

Finally, the use of a transfer device for the lined pipe insulating shells is expedient in order to arrive at a fully automatic line, whereby a cooling device on the downstream side is used in order to dissipate the surface heat from the finished-lined pipe insulating shell which might otherwise lead to adhesion of the overhanging sealing tab when the shells are packaged.

BRIEF DESCRIPTION OF THE DRAWINGS

Various other objects, features and attendant advantages of the present invention will be more fully appreciated as the same better understood from the following detailed description when considered in connection with the accompanying drawings in which like reference characters designate like or corresponding parts throughout the several views and wherein:

FIG. 3a through 3d show the operating principle of the lining process.

DETAILED DESCRIPTION OF THE PREFERRED EMBODIMENT

Figure 1:
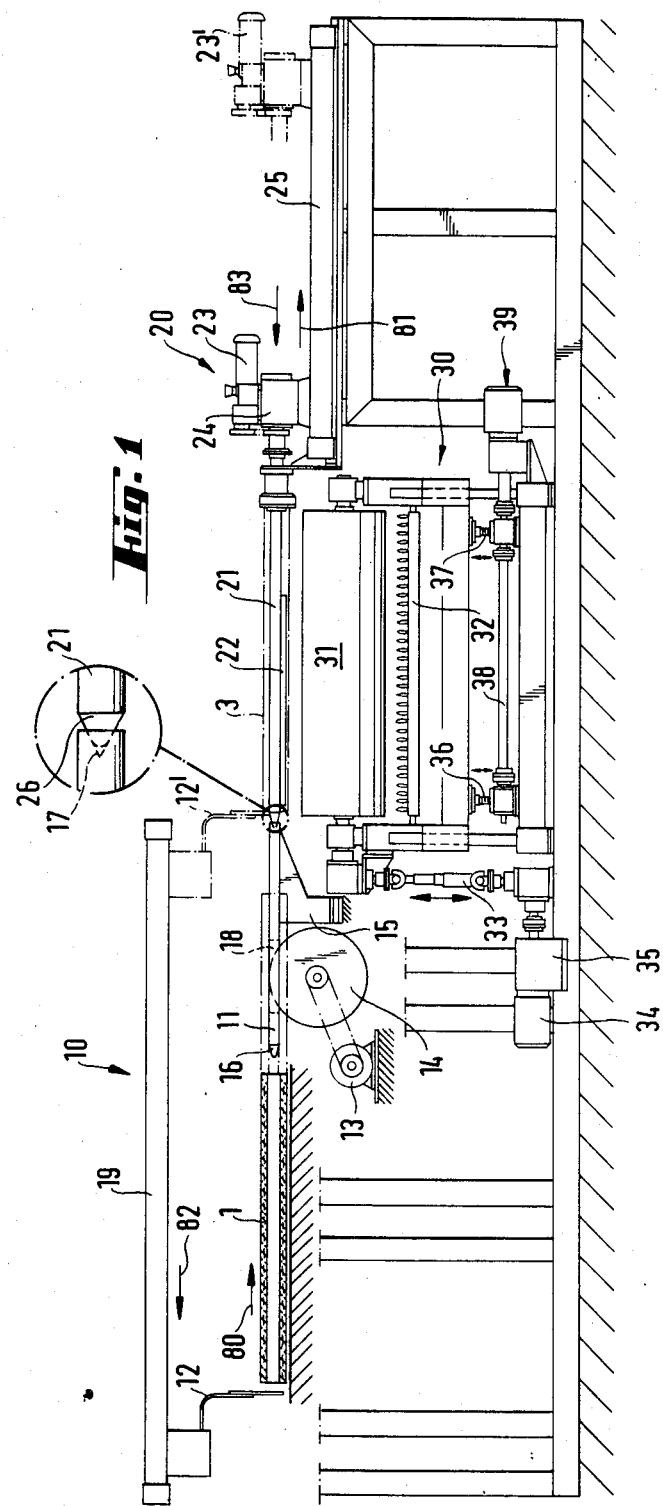
FIG. 1 is a simplified view of the apparatus according to the invention without a feed device for the foil, a transfer device or a cooling device.

On the left-hand side in FIG. 1 there is a simplified view of a loading station 10 including a receiving mandrel 11, a transport arm 12 adapted for movement in the direction of the receiving mandrel 11 and a cutting blade 14 driven by an electric motor 13. The receiving mandrel 11 is held in a fixed position by a sword-like plate 15. The left-hand end face 16 of the receiving mandrel 11 is conical in construction for better reception of an unslit pipe insulating shell 1 which is to be lined and which in the present case is formed of glass wool. The right-hand end face of the receiving mandrel 11 has a conical depression 17. To provide a continuous longitudinal slit 2 in the pipe insulating shell 1, cutting blade 14— in the present case a circular knife—is so disposed that it extends through the receiving mandrel 11 in which there is a central slot at 18. The transport arm 12 is fixed on a hydraulic or pneumatic piston-cylinder assembly 19 which moves in two directions and can be moved to the position 12' shown by the broken lines.

Shown in the middle of FIG. 1 is a winding device 20 which includes a winding mandrel 21 positioned coaxially of the receiving mandrel 11. The winding mandrel 21 has a radially projecting guide and drive strip 22, and is connected to a gear mechanism 24 which can be driven by an electric motor 23. The gear mechanism and motor can in turn be moved by a bidirectionally operating hydraulic or pneumatic piston-cylinder assembly 25 (to a position indicated at 23'). The thickness of the guide strip 22 is so chosen that it is slightly smaller than the inside width of the longitudinal slit 2 shown in FIG. 3 and provided in the slit shell 3. The free end of the winding mandrel 21 is conical at 26 in order to be able to make a centred and rotating push-in connection at 17 with the receiving mandrel 11.

Underneath the winding device 20 is the lining station 30 which comprises a heating roller 31 and a gas burner 32 for heating the same. The heating roller 31 is driven, via a telescopic universal linkage 33, by an electric motor 34 and a gear mechanism 35. Furthermore, the heating roller 31 with the gas burner 32 is adjustable in height; in the illustrated embodiment this is accomplished by means of two threaded spindles 36 and 37 which are connected, via a shaft 38, to an electrically gear-assisted drive assembly 39. Rotation of the spindles in fixed threaded collars of the lining station raises or lowers the lining station.

Figure 2:
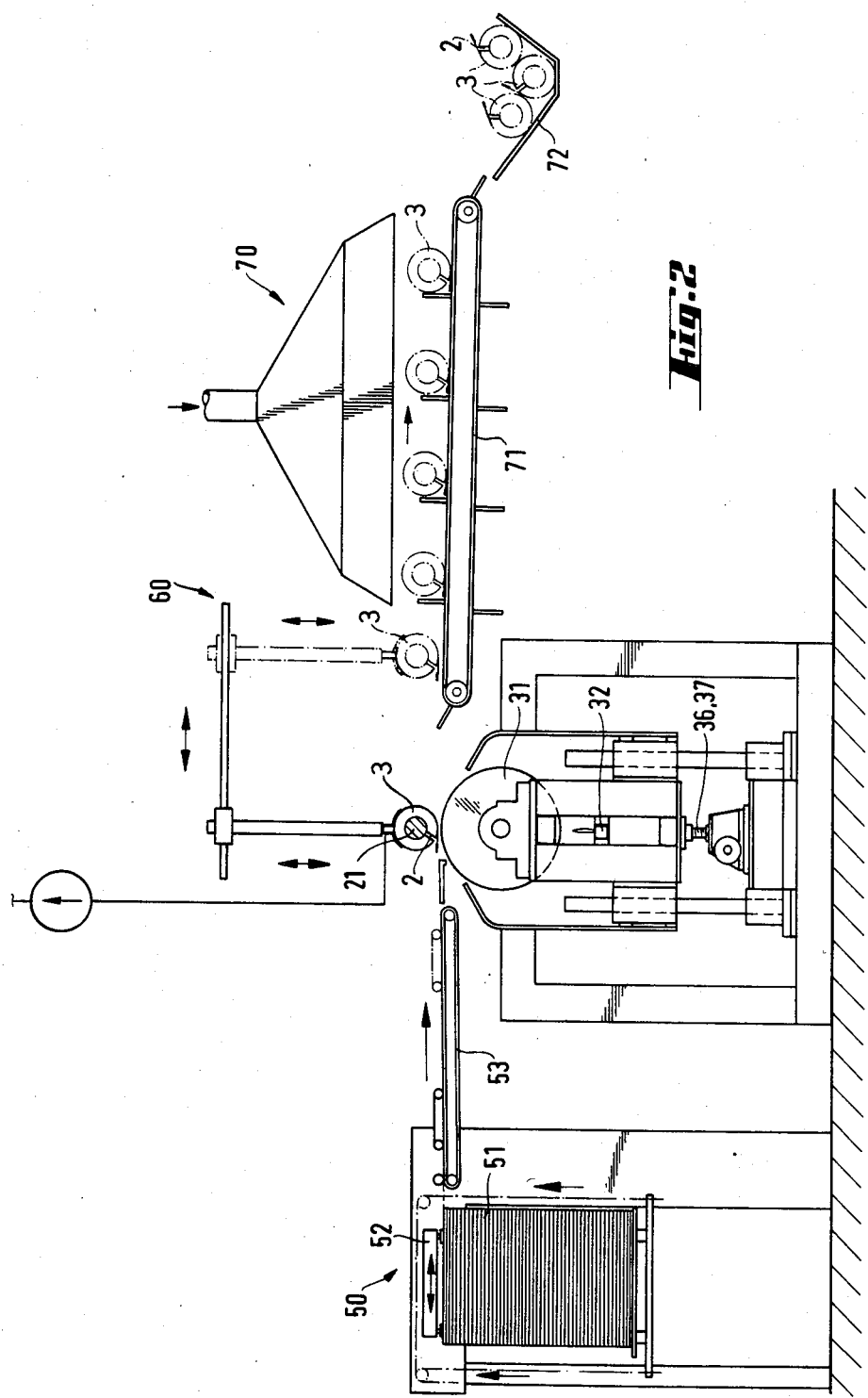
FIG. 2 is a simplified view of the lining station with a feed device for foil and a transfer device with a cooling device.

The simplified side view of the apparatus according to the invention in FIG. 2 shows at 50 a feed device for foils 51 which in the present case consist of an aluminium foil reinforced by a diagonal glass silk inlay, the inlay side being coated with polyethylene as the heat activatable adhesive. The feed device 50 consists essentially of a per se known so called automatic sheet feeder which, by means of a conveyor belt 53 and a vacuum gripper 52, delivers to the winding mandrel a foil 51 which has already been cut to length.

Furthermore, FIG. 2 schematically shows a vacuum-operated transfer device 60 for carrying away the lined pipe insulating shell 4. Finally, there is also schematically shown in FIG. 2 a cooling device 70 by which the freshly lined pipe insulating shells 4 are cooled by air so that the completed pipe insulating shells 4 can be packed, for example in cartons, directly after the lifting process without any intermediate storage.

The method of lining a pipe insulating shell 1 by use of the apparatus according to the invention with, for example, a cycle time of only 7 seconds is carried out as follows: via a lateral chute, not shown, an unslit pipe insulating shell 1 is fed coaxially to align with the receiving mandrel 11 of the loading station 10. Then, the pipe insulating shell 1 is pushed by the transport arm 12 onto the receiving mandrel 11 as indicated by the arrow 80 in FIG. 1, the longitudinal slit 2 (FIG. 3) being simultaneously cut or milled (shown by dash-dotted lines in FIG. 1) into the pipe insulating shell 1 by means of the rotating circular knife 14. The conical end portion 16 of the receiving mandrel 11 has the effect of centering the shell 1 on the receiving mandrel 11 as the shell is being mounted thereon, the cross-section of the mandrel 11 being slightly smaller than the inside cross-section of the internal bore in the pipe insulating shell 1.

With a continuous rightward movement (as seen in FIG. 1) of the transport arm 12, the slit pipe insulating shell 3 is pushed onto the winding mandrel 21 which is disposed coaxially of the receiving mandrel 11, until the transport arm 12 has reached the position 12' indicated by the broken lines. During this pushing-on process, the pipe insulating shell 3 is prevented from rotating, first by the sword-like plate 15 which passes through the longitudinal slit 2 and then by the guide strip 22 which likewise fits within the longitudinal slit 2. As a result, the insulating shell 3 is maintained non-rotatable in a position required for the actual lining process.

During the pushing-on operation of the pipe insulating shell 1 (3) onto the receiving mandrel 11 and the winding mandrel 21, a foil 51 is brought by means of the conveyor belt 53 into preliminary position (FIG. 3a) where the free end portion 54 of the foil 51 is angled-over slightly downwardly by means of a rail 56 mounted for rotation on an axis parallel with the heating roller 31.

Further movement of conveyor 53 brings the foil 51 into a position of readiness (FIG. 3b) in which the leading edge of the angled-over portion 54 comes to bear on the hearing roller 31 which is initially at a slight distance 57 from the outside face of the pipe insulating shell 3. The leading edge of the portion 54 thereby bordering on an imaginary plane which is an extension of the longitudinal slit in the pipe insulating shell 3. The distance 57 may, for example, be 10 mm. The end portion 54 of the foil 51 contacting the heating roller 31, which is heated by the gas burners 32 to about 280° C., initiates an onset of activation of the adhesive of the foil 51.

Then, by means of the motor driven threaded spindles 36, 37, the heating roller 31 is raised until such time as there is surface contact between the heating roller 31 having foil 51 thereon, and the outer face of the pipe insulating shell 3. When the leading edge of the foil 51 bears on the pipe insulating shell 3, the heating roller 31 is held in this adhering position (FIG. 3c) for a first dwell period of about 2/10 to 3/10 seconds before the actual lining process is initiated.

After this short period of dwell, the heating roller 31 is driven by means of the motor 34, the gear mechanism 35 and the linkage 33 while the pipe insulating shell 3 is simultaneously driven by the winding mandrel 21 via the motor 23 and the gear mechansim 24, the two being driven at the same peripheral speed but in opposite directions until such time as the now lined pipe insulating shell has been rotated through about 340° to 350° (FIG. 3d) to result in the lined pipe insulating shell 4.

The heating roller 31 again remains briefly for a second dwell period (2/10 to 3/10 sec.) in this position in order to achieve complete adhesion before it is lowered again into its starting position. Simultaneously with the lowering of the heating roller 31, the winding mandrel 21 is retracted by means of the piston-cylinder assembly 25 in the direction of the arrow 51 in FIG. 1 and out of the lined pipe insulating shell 4 (to a position indicated at 23'). At the same time, the transfer device 60 with a per se known vacuum gripper pivots over to the pipe insulating shell 4, picks this up and transfers it to a conveyor belt 71 of the cooling apparatus 70 in which the pipe insulating shells 4 are exposed to cooling air before they can fall into a channel 72 in order to be packaged, for example in cartons.

During the actual lining process, the transport arm moves from the position 12' in the direction of the arrow 82 back into its starting position in order to be able to push a fresh pipe insulating shell 1 onto the receiving mandrel 11. Furthermore, directly after the pivoting away of the transfer device 60, the winding mandrel 21 moves in the direction of the arrow 83 from the position 23' back into its starting position and is thereby so turned that its guide strip 22 is again directed vertically downwardly. Then the method of lining a pipe insulating shell 1 which has been described is automatically repeated.

The foil 51 shown in FIG. 3 can also have an end portion 58 extending over the width of the foil and comprising an adhesive tab strip which is covered by a pull-off strip, so that after application of the pipe insulating shell 4, e.g., on a portion of pipe which is to be lagged, and after removal of the tear-off strip, the end portion 58 can be stuck to the shell 4, closing the longitudinal slit 2.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of lining a pipe insulating shell formed of mineral fibers with a foil having a coating of heat activatible adhesive, comprising the steps of:
   pre-positioning a free end of said foil with a downward angled orientation;
   resting a leading edge of said free end of said foil on the upper surface of a heating roller positioned below a pipe insulating shell, whereby said adhesive is preliminary activated at said leading edge;
   moving said roller towards said shell until said leading edge of said free end of said foil bears on said shell;
   maintaining said leading edge pressed against said shell by said roller for a first dwell period; and
   separately rotatably driving said shell and said roller in opposite directions and with the same peripheral speed to line said foil on said shell.

2. The method of claim 1, wherein said shell has a continuous longitudinal slit, including the step of, prior to said pre-positioning step, pushing said shell onto a winding mandrel having an axis parallel to that of said roller and having a downwardly projecting radial guide strip which fits into said slit during said pushing step, wherein said pushing step is performed simultaneously with said step of resting said leading edge on said roller, and wherein following said resting step said leading edge is positioned adjacent a plane including said guide strip.

3. The method of claim 2, including the steps of forming said slit by pushing an unslit shell onto a receiving mandrel disposed coaxially with said winding mandrel, said receiving mandrel having slit forming cutting means, and continuing to push said shell from said receiving mandrel onto said winding mandrel.

4. The method of claim 2, wherein said rotatably driving step comprises driving said winding mandrel until said shell has been rotated by between 340° and 350°, including the steps of:
  maintaining said roller pressed against said wound foil on said shell for a second dwell period to assure adhesive bonding of said foil to said shell so as to cover said slit;
  withdrawing said roller from said shell after said second dwell period; and
  simultaneously with said withdrawing step, moving said shell away from said roller.

5. The method of claim 3, wherein said rotatably driving step comprises driving said winding mandrel until said shell has been rotated by between 340° and 350°, including the steps of:
  maintaining said roller pressed against said wound foil on said shell for a second dwell period to assure adhesive bonding of said foil to said shell so as to cover said slit;
  withdrawing said roller from said shell after said second dwell period; and
  simultaneously with said withdrawing step, moving said shell away from said roller.

6. The method of claim 1, wherein said adhesive comprises polyethylene.

7. The method of claim 1, wherein said foil comprises an aluminum foil reinforced by diagonal glass fibers.

8. The method of claim 7, including an adhesive strip having a pull off tab on an end of said foil opposite said leading edge.

9. An apparatus for lining a pipe insulating shell formed of mineral fibers with a foil having a coating of heat activatible adhesive, comprising:
  a pipe insulating shell loading station comprising:
    (a) an elongate receiving mandrel having a central slot,
    (b) transport arm means for moving a shell in the longitudinal direction of said receiving mandrel and onto said receiving mandrel, and
    (c) cutting means in said central slot for forming a continuous longitudinal slit in a shell being mounted onto said receiving mandrel; a shell winding device comprising:
    (d) an elongate winding mandrel coaxial with said receiving mandrel and including means for connecting to an end of said receiving mandrel, said winding mandrel further including a radially projecting guide strip,
    (e) means for rotating said winding mandrel, and
    (f) means for moving said winding mandrel into abutment with said receiving mandrel such that said connecting means can connect said receiving and winding mandrels, wherein said transport arm means includes means for moving a slitted shell onto said winding mandrel, whereby said guide strip fits in said slit; a lining station comprising:
    (g) a heating roller extending below and parallel to said winding mandrel;
    (h) means for vertically moving said heating roller, and
    (i) means for rotating said heating roller; and
  means for feeding a foil to said lining station, comprising:
    (j) a bar positioned laterally of said lining station and pivotally mounted on an axis parallel with said heating roller.

10. The apparatus of claim 9, including means for transferring a shell out from said lining station.

11. The apparatus of claim 9, including means for cooling a lined pipe, said means for cooling being positioned laterally of said lining station and opposite said feeding means.

12. The apparatus of claim 10, including means for cooling a lined pipe, said means for cooling being positioned laterally of said lining station and opposite said feeding means.

* * * * *